Jan. 31, 1928.   W. R. HORNBERGER   1,657,928
SHIP TELEGRAPH
Filed Aug. 27, 1921   11 Sheets-Sheet 1

INVENTOR
William R. Hornberger.
BY
ATTORNEYS

Jan. 31, 1928.

W. R. HORNBERGER

SHIP TELEGRAPH

Filed Aug. 27, 1921 — 11 Sheets-Sheet 3

1,657,928

Jan. 31, 1928.

W. R. HORNBERGER

SHIP TELEGRAPH

Filed Aug. 27, 1921    11 Sheets-Sheet 6

1,657,928

Jan. 31, 1928.

W. R. HORNBERGER

SHIP TELEGRAPH

Filed Aug. 27, 1921    11 Sheets-Sheet 8

1,657,928

WITNESSES

INVENTOR
William R. Hornberger.
BY
ATTORNEYS

Jan. 31, 1928.                                             1,657,928
W. R. HORNBERGER
SHIP TELEGRAPH
Filed Aug. 27, 1921        11 Sheets-Sheet 9

WITNESSES

INVENTOR
William R. Hornberger
BY
ATTORNEYS

Patented Jan. 31, 1928.

1,657,928

UNITED STATES PATENT OFFICE.

WILLIAM REED HORNBERGER, OF PHILADELPHIA, PENNSYLVANIA, ASSIGNOR OF ONE-HALF TO CHARLES ALBERT GEHRMANN, OF PHILADELPHIA, PENNSYLVANIA.

SHIP TELEGRAPH.

Application filed August 27, 1921. Serial No. 496,072.

My invention relates to improvements in ship telegraphs, it being more particularly an improvement on the ship telegraph disclosed in my Patent Number 1,575,599, and it consists in the constructions, combinations and mode of operation herein described and claimed.

An object of the invention, and one which relates particularly to the specific improvement herein disclosed, is to provide means, including a relay or the like, associated with each order indication to insure the sole activity of that order indication and none other, when the necessary operation is carried out to transmit that order.

Other objects and advantages of the invention will appear in the following specification, reference being had to the accompanying drawings, in which:—

Figure 1:
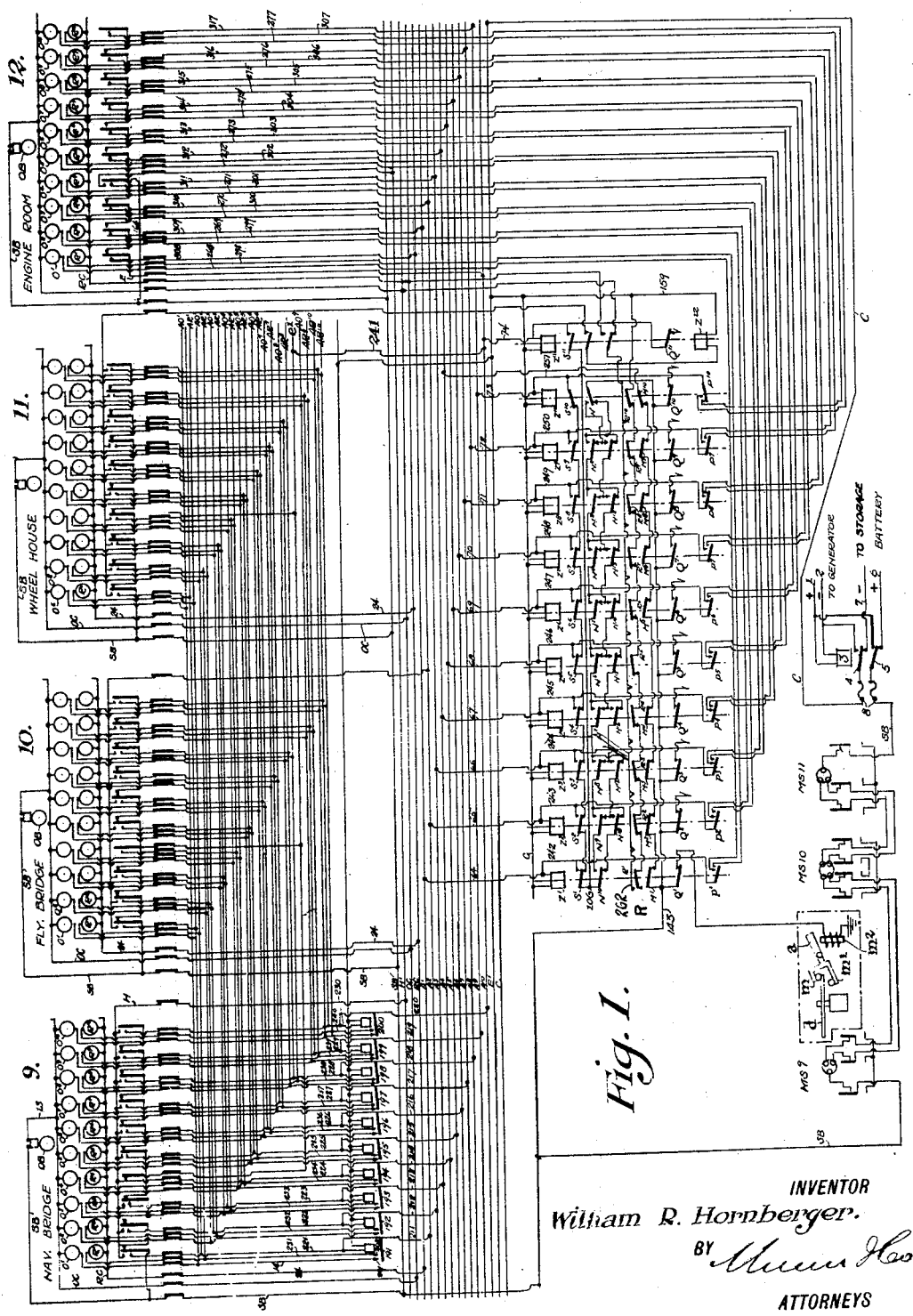
Figure 2:
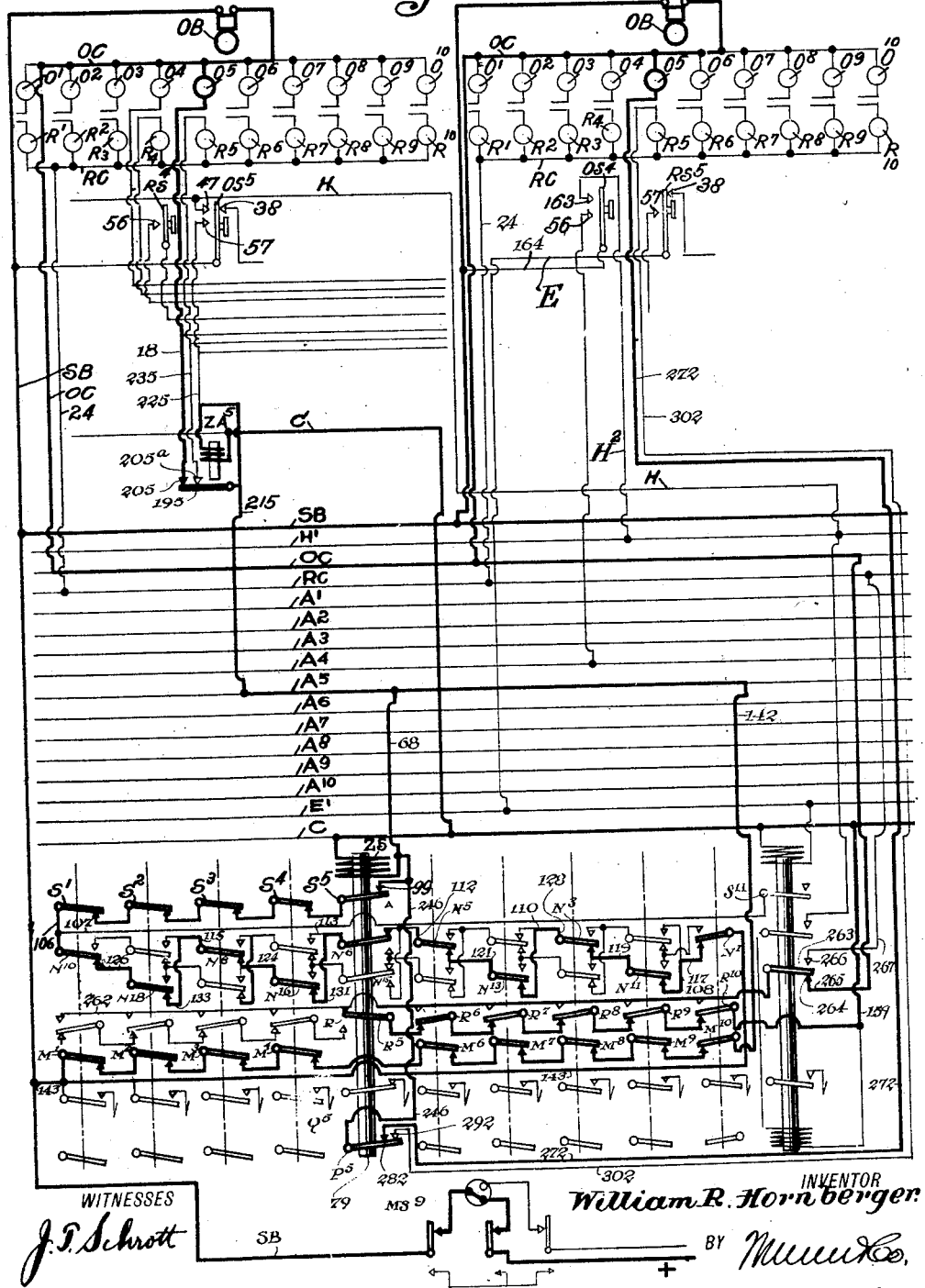
Figure 3:
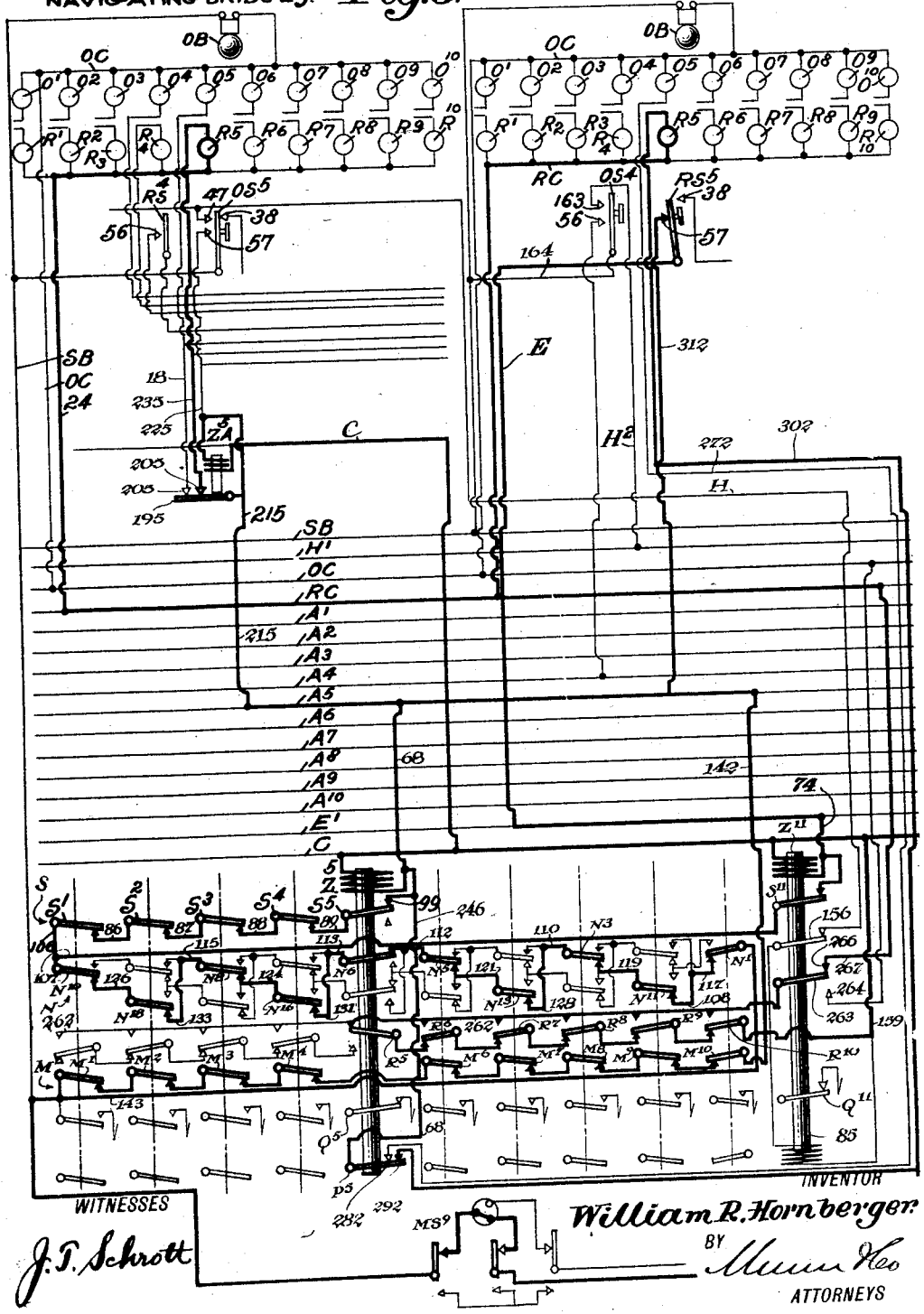
Figure 4:
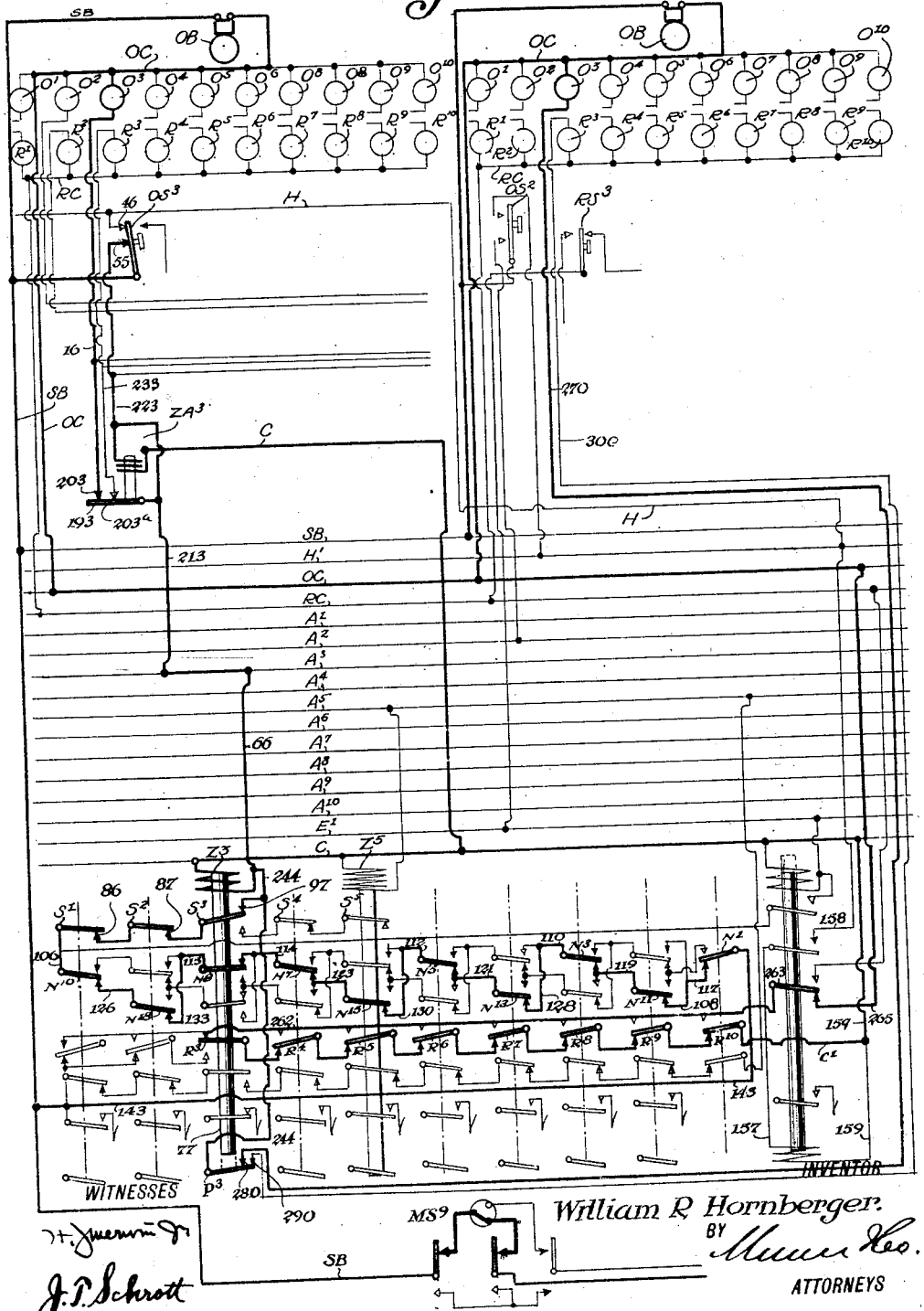
Figure 5:
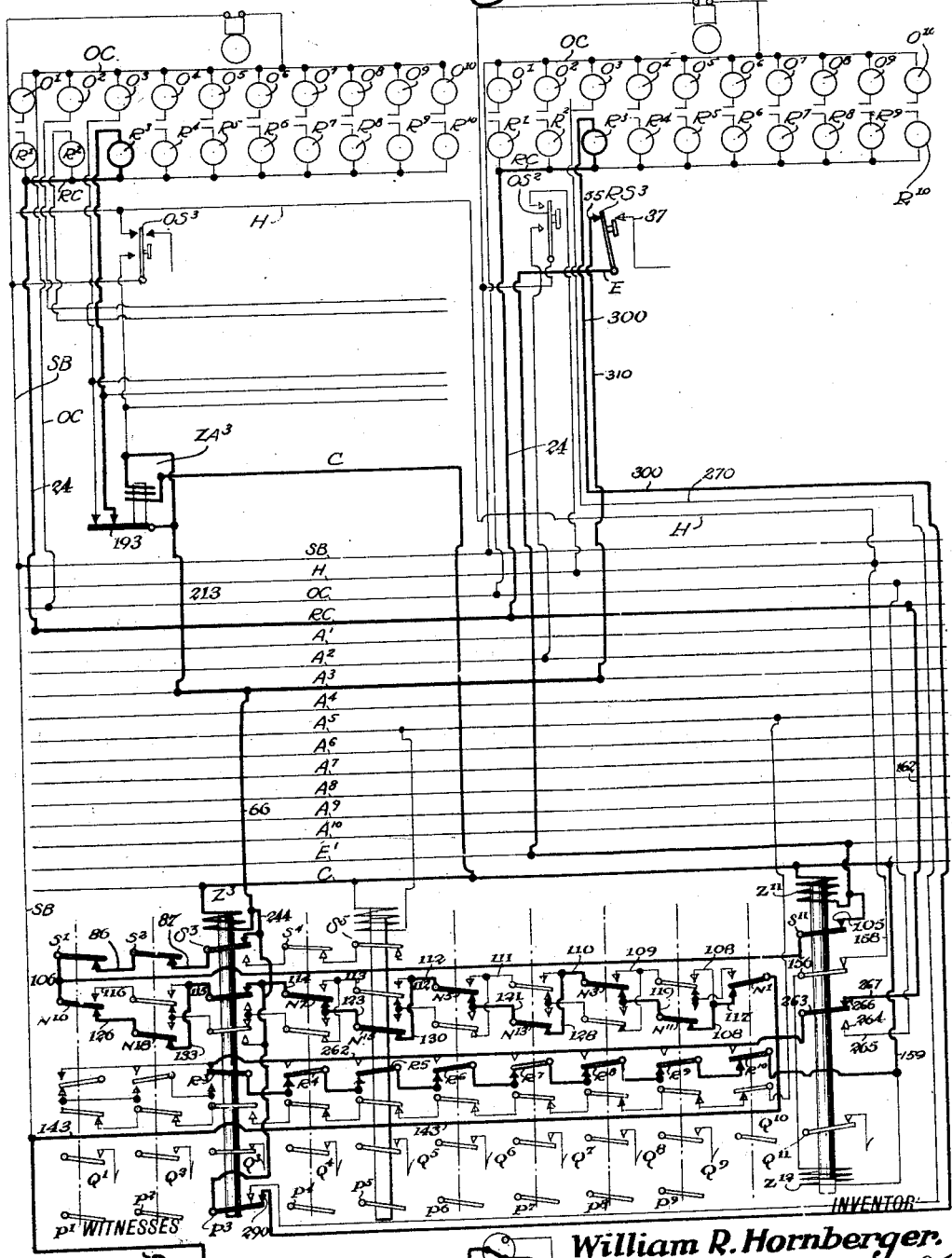
Figure 6:
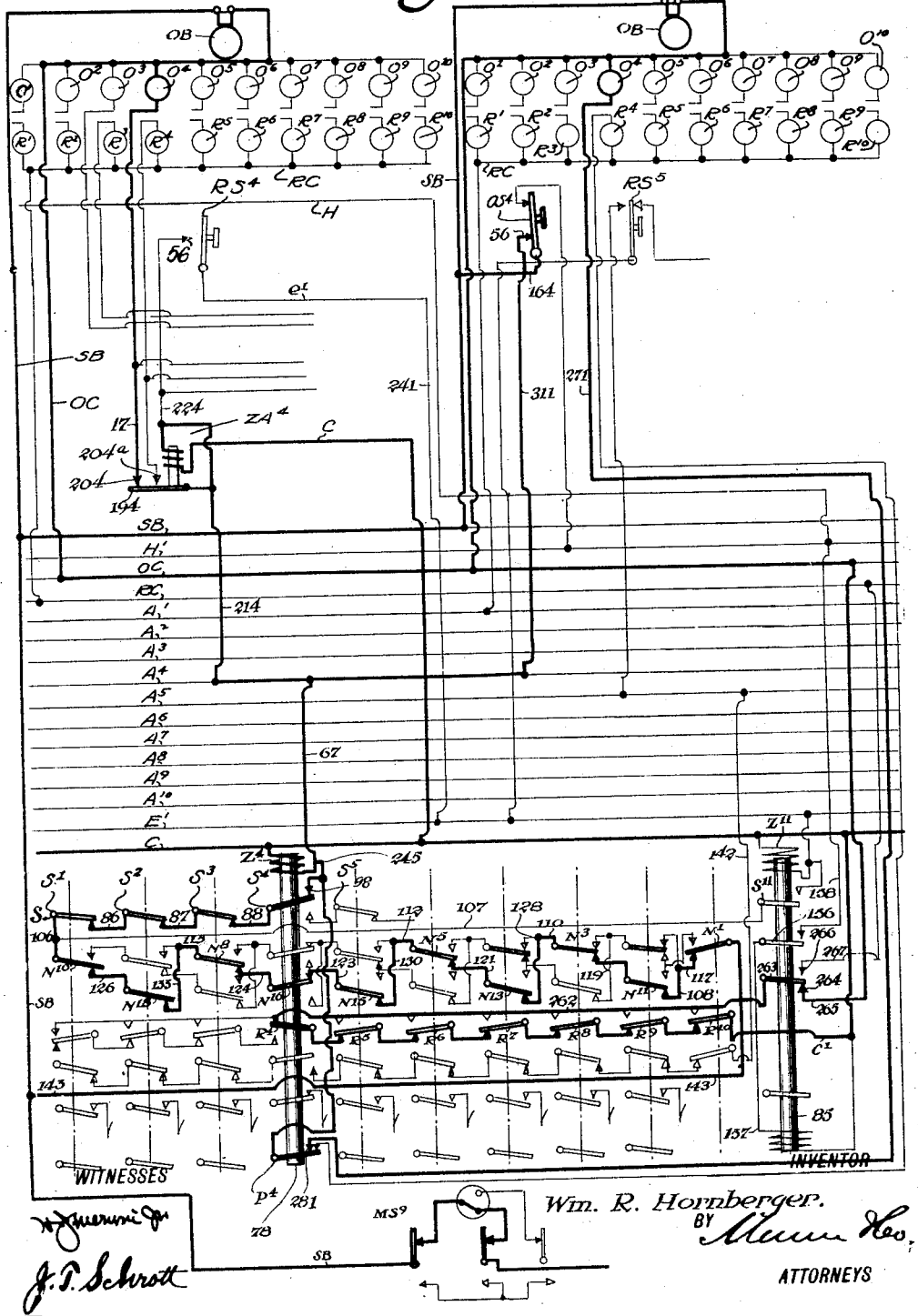
Figure 7:
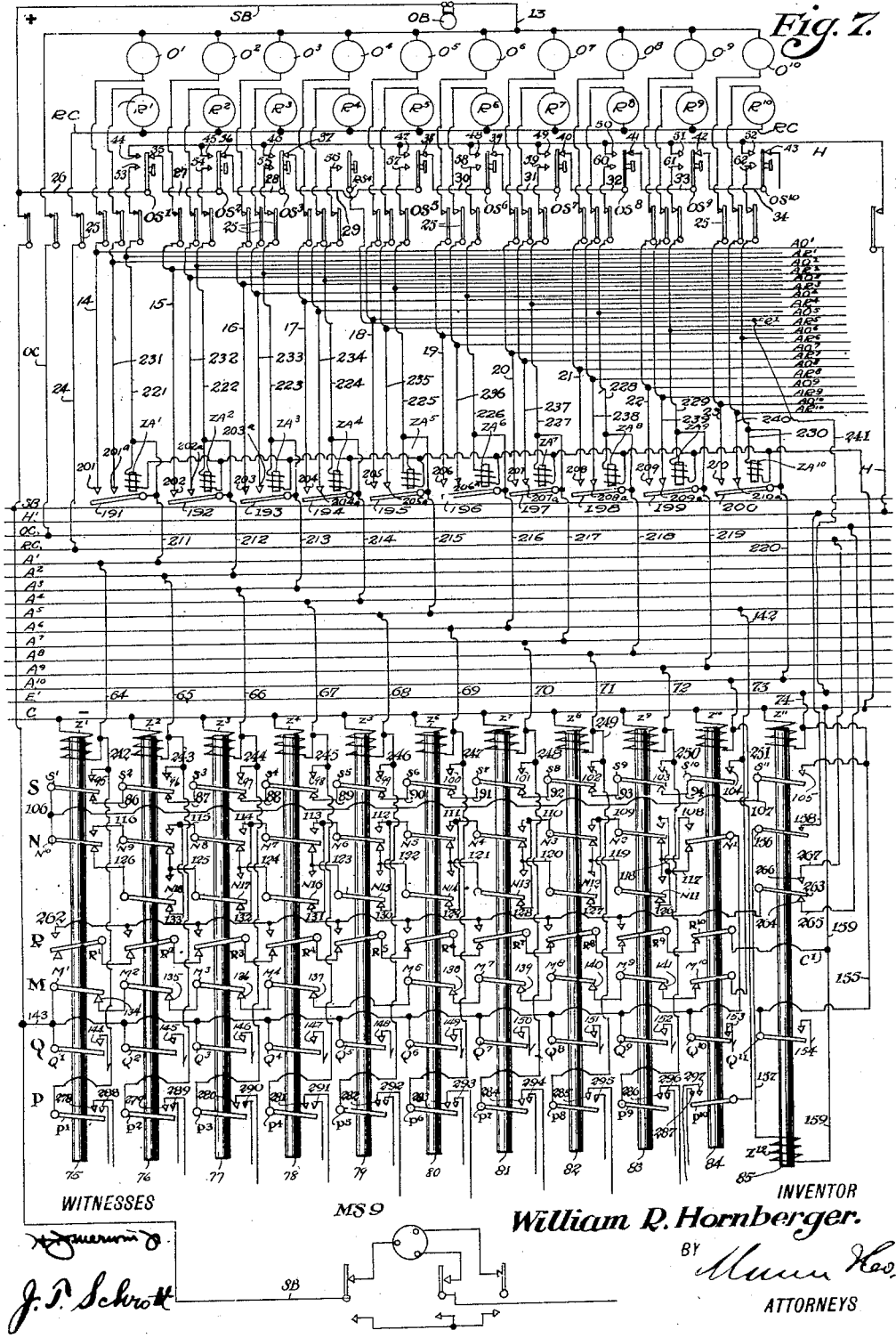
Figures 8, 9:
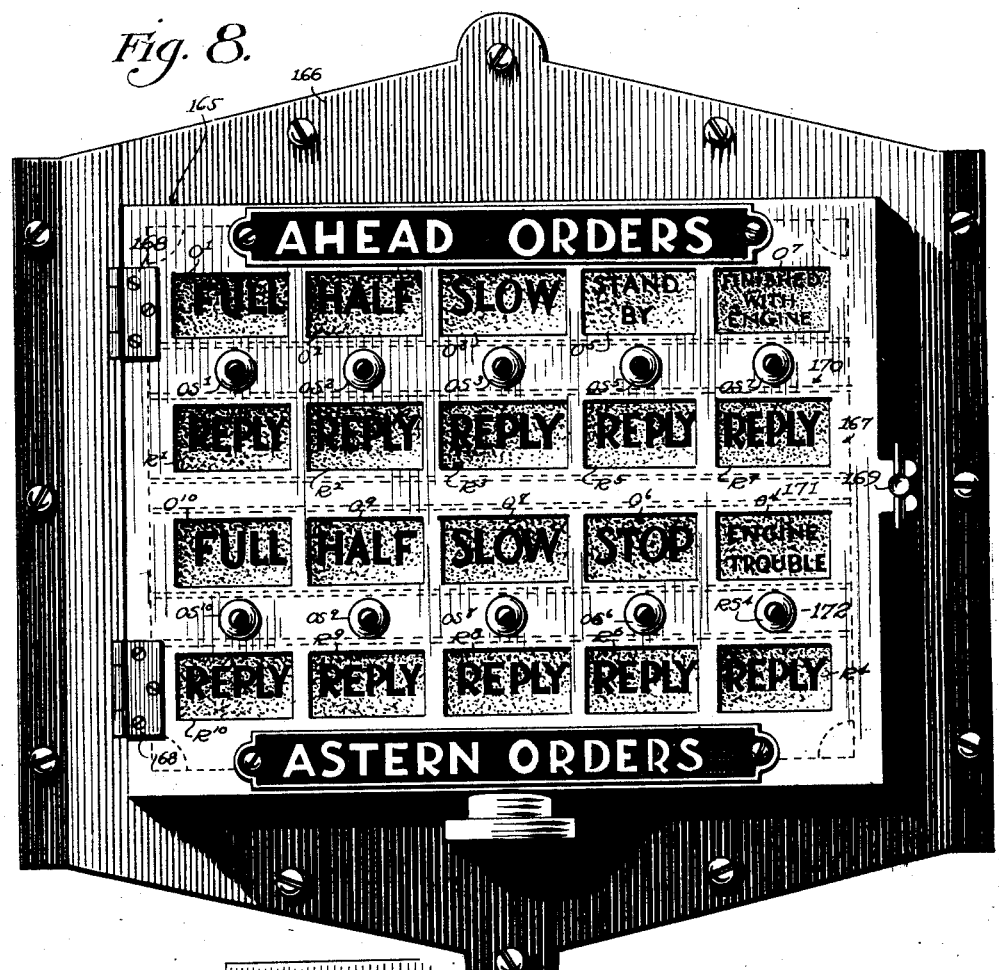
Figure 10:
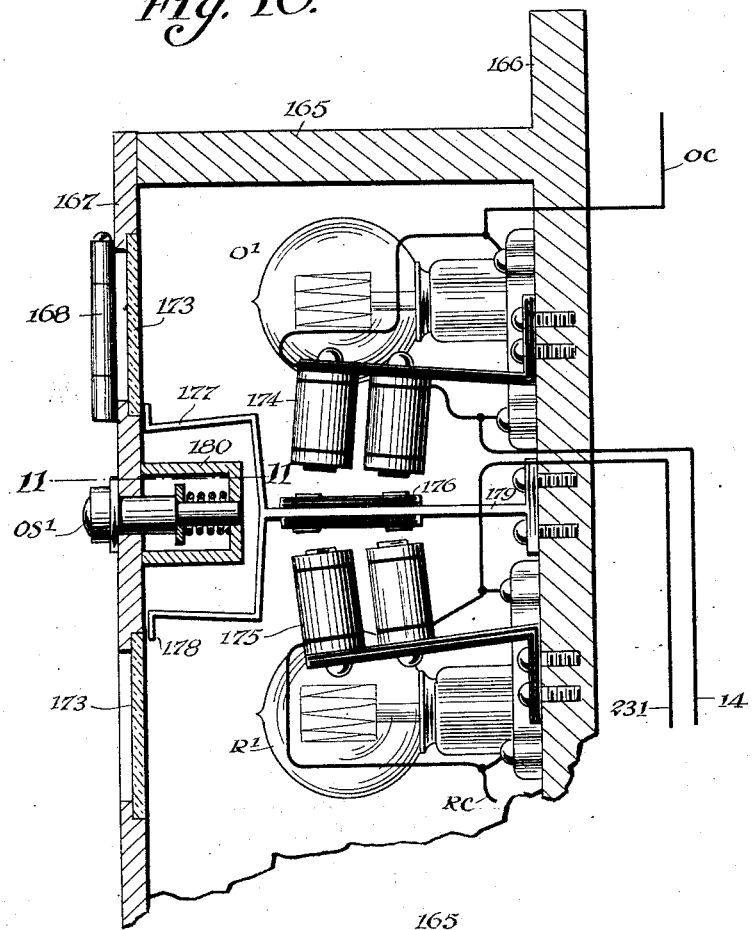
Figure 11:
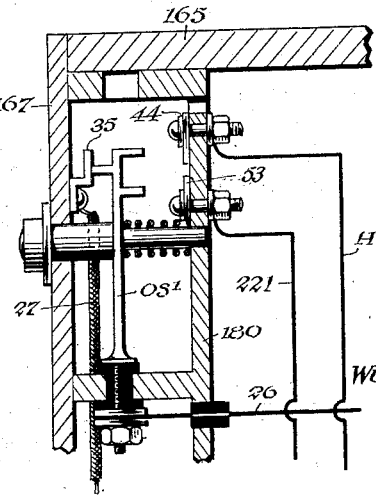
Figure 12:
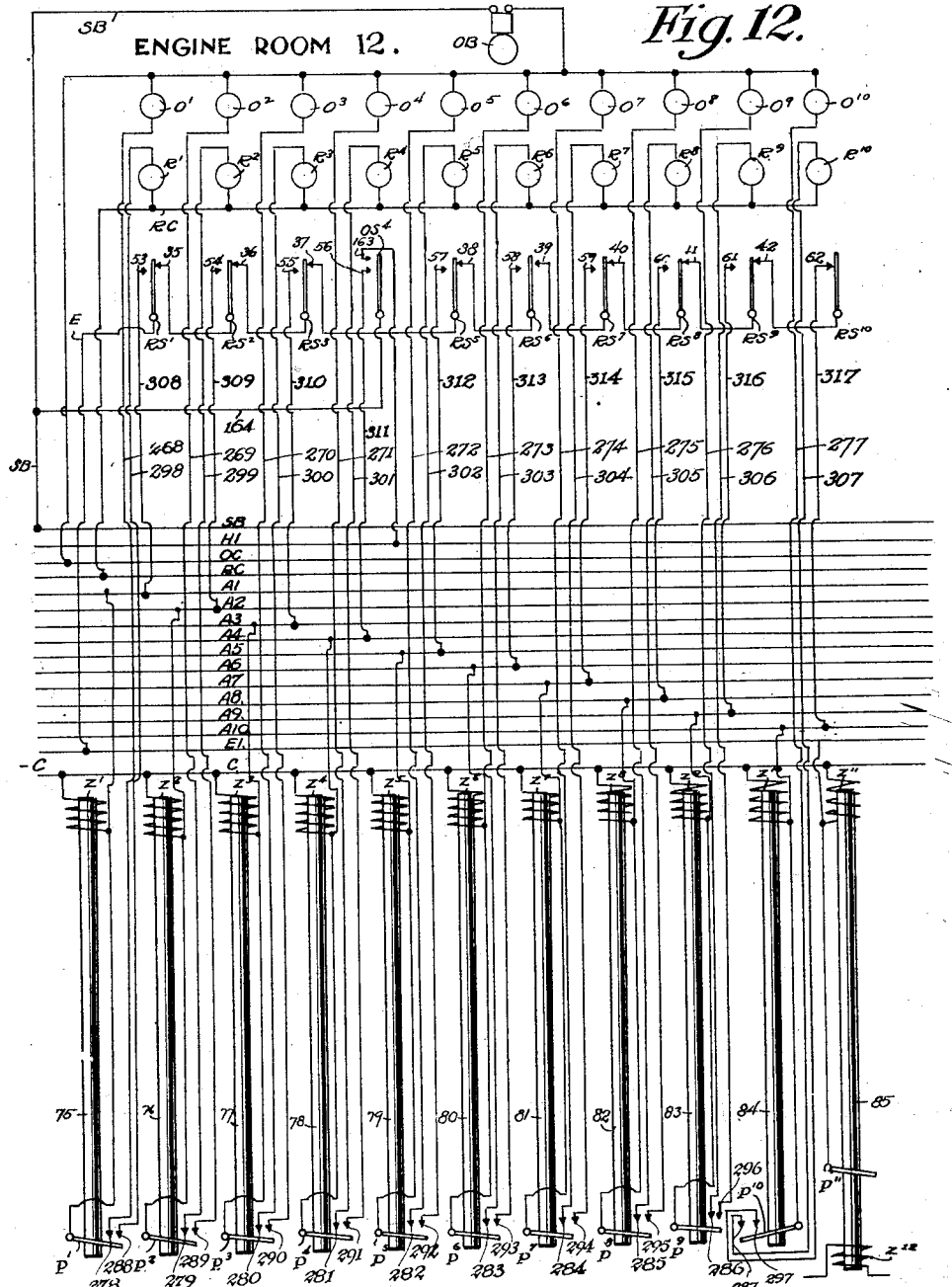
Figure 13:
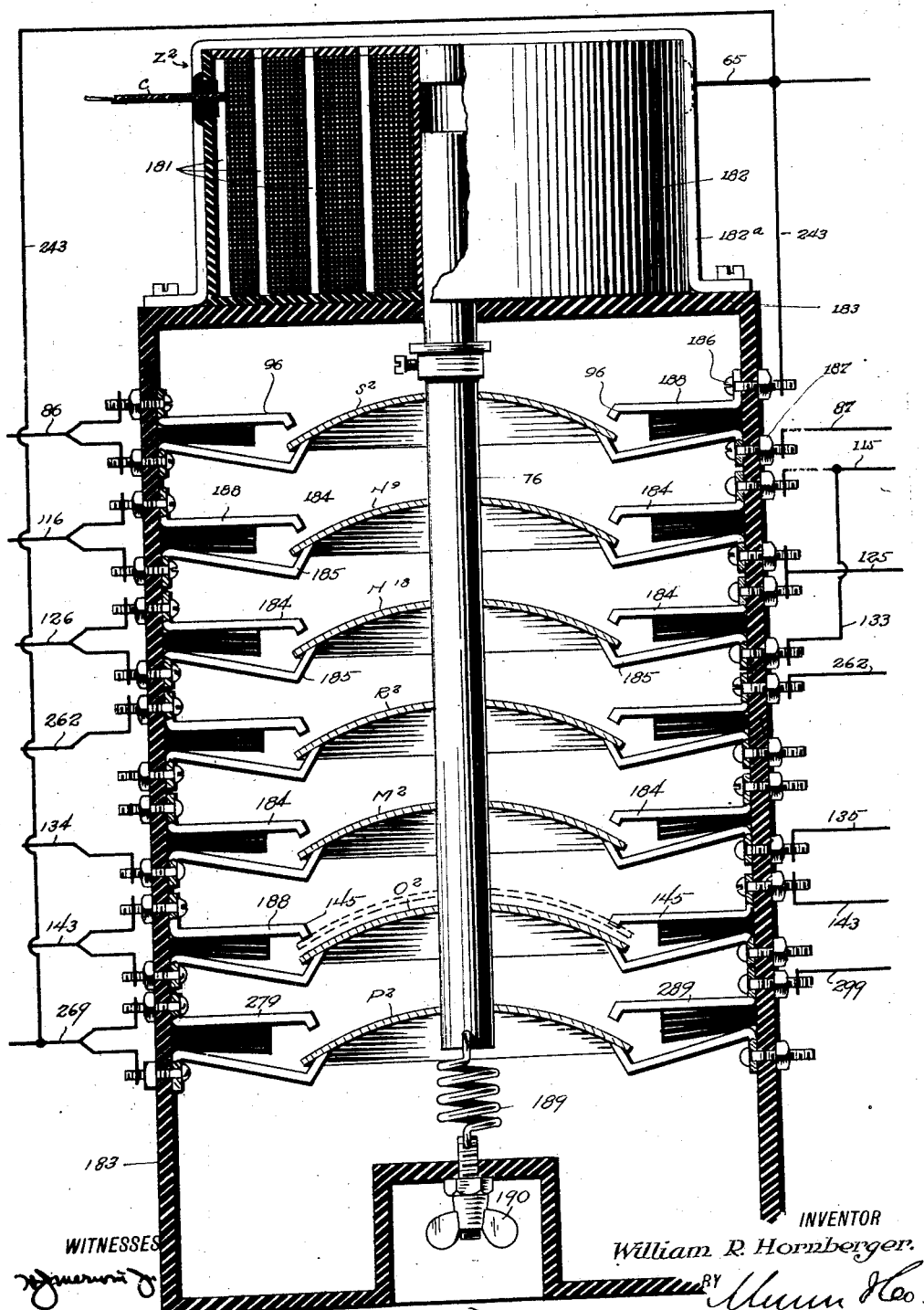

Figure 1 is a diagram illustrating the various circuits of the ship telegraph, three transmitting instruments or "order" stations and one receiving station being shown, Figure 2 is a diagram illustrating the actions that take place on initially closing the main switch at the bottom, Figure 3 is a diagram illustrating the actions that take place when the engineer replies to the "stand by" order which is rendered prominent on initially closing the main switch, Figure 4 is a diagram illustrating the actions that take place when one of the operators actuates the "slow" order, Figure 5 is a diagram illustrating the actions that take place when the engineer replies to the "slow" order, Figure 6 is a diagram illustrating the actions that take place when the engineer apprises all "order" stations of engine trouble, Figure 7 is a detail view of the mechanism of one of the transmitting instruments or "order" stations, also showing the cooperating relays which are common to the whole telegraph, Figure 8 is a front elevation of one of the transmitting instruments showing the arrangement of the push buttons of the "order" switches and the corresponding orders, Figure 9 is a detail view of one of the "order" compartments, Figure 10 is a detail vertical section on the line 10—10 of Figure 9, Figure 11 is a horizontal section on the line 11—11 of Figure 10, Figure 12 is a diagram similar to Figure 7, illustrating more clearly the electrical connections between the receiving station in the engine room and bank of relays, and Figure 13 is a detail view of one of the relays.

This invention is related to the ship telegraph disclosed in my Patent No. 1,575,599 and it consists particularly of a relay so associated with each order signal that only the intended one of the order signals will become operative upon the transmission of an order. The invention also includes certain primary and secondary safety circuits which cooperate with said relays.

In order that the reader may obtain a clear and connected understanding of the ship telegraph, the following specification begins with a description of the general construction, proceeding with the descriptions of the action taking place on initially energizing the telegraph system, sending the "slow" order, replying to the "slow" order, sending the "engine trouble" order from the engine room, and concluding with a résumé of the features of advantage of the invention. To further aid in the understanding of the construction and in following the accompanying reading matter, attention is directed to this:

Schedule of symbols.

SB Signal battery or positive line wire.
C Common return or negative line wire.
O Order indication.
R¹ Reply indication.
OS Order switch.
RS Reply switch.
OC Order common or negative return wire.
RC Reply common or negative return wire.
A Busses or main lines.
AO Auxiliary order busses.
AR Auxiliary reply busses.
Z Relay solenoids.
S Solenoid "stick" control circuit.
N Current controlling contactors or relay "jumpers."
M "Stand by" circuit.
OB Order bell.

E    Engine room reply wire.
H    Restoring wire.
Q    Time recording means.
R    Primary safety circuit.
P    Secondary safety circuit.

The general construction of the improved ship telegraph is diagrammatically but clearly illustrated in Figure 1, to which attention is first directed. In the normal operation of the telegraph, current is supplied by a suitable generator over the positive wire 1, returning over the negative wire 2. When the current thus flows, the suitably wound magnet 3 is energized, attracting the contactors 4, 5 of the associated switch, conducting the current to the main positive line wire SB and enabling the current to return over the common negative wire C.

The switch structure thus partially described, and illustrated at the right of Figure 1, is what may be termed for convenience, a "no voltage release." The position of the device shown, illustrates the current from the generator as having failed, whereupon the switch members 4, 5 drop to the lowermost position and engage suitably arranged contacts of positive and negative wires 6, 7 leading to a storage battery of a suitable type. This provision makes it possible to keep the telegraph in operation even should the current from the main source, i. e. the generator, fail. Suitable fuses 8 are interposed in the wires SB and C, as shown, for purposes of protection.

A plurality of transmitting stations is shown, these being respectively indicated 9, "the navigating bridge", 10, "the flying bridge", and 11, "the wheel house". Although but a single receiving instrument 12 is shown, any number of such receiving instruments may be used in the engine room of the ship.

Since all of the transmitting instruments 9, 10 and 11 are the same in construction and operation and only the receiving instrument 12 is different, only one transmitting instrument is described below and illustrated in connection with the receiving instrument in Figures 2 to 6 of the drawing. Reference is now directed to Figure 7 in which one of the transmitting instruments, for example, the instrument 9 on the navigating bridge, is shown in detail.

Located at the top is the order bell OB to which the positive line wire SB is connected at one side, the other side being connected to the order common wire OC by means of the wire 13. Ten order indications $O^1$, $O^2$, $O^3$, $O^4$, $O^5$, $O^6$, $O^7$, $O^8$, $O^9$, and $O^{10}$ are connected at one side to the wire OC, the other side of the order indications being connected to the busses $A^1$, $A^2$, $A^3$, $A^4$, $A^5$, $A^6$, $A^7$, $A^8$, $A^9$, and $A^{10}$ by wires 14, 15, 16, 17, 18, 19, 20, 21, 22 and 23 which embrace the relays $ZA^1$, $ZA^2$, $ZA^3$, $ZA^4$, $ZA^5$, $ZA^6$, $ZA^7$, $ZA^8$, $ZA^9$ and $ZA^{10}$.

The latter relays in combination with associated structure constitute the present invention.

The armature contactors 191, 192, 193, 194, 195, 196, 197, 198, 199 and 200 are normally open or out of engagement with the pairs of front points 201, $201^a$; 202, $202^a$; 203, $203^a$; 204, $204^a$; 205, $205^a$; 206, $206^a$; 207, $207^a$; 208, $208^a$; 209, $209^a$ and 210, $210^a$; the first contacts of the respective pairs being those to which the wires 14, 15, etc. are connected. The contactors 191, 192, etc. are connected to the busses $A'$, $A^2$, etc., through wires 211, 212, 213, 214, 215, 216, 217, 218, 219 and 220, which wires are also connected to wires 221, 222, 223, 224, 225, 226, 227, 228, 229 and 230, which extend from the relays $ZA^1$, $ZA^2$ etc., to the various order switches $OS^1$, $OS^2$ etc., all as clearly disclosed in Figure 7 and in the description following.

Running alongside of the wires 14, 15 etc., but connected to the front points $201^a$, $202^a$, etc. are wires 231, 232, 233, 234, 235, 236, 237, 238, 239, and 240, extending to the reply indications $R^1$, $R^2$, etc., more specifically described below. Corresponding wires 14, 231; 15, 232; etc. respectively relating to the order and reply indications $O^1$, $R^1$; $O^2$, $R^2$, etc. of the various sending stations 9 etc. are connected by auxiliary busses $AO^1$, $AR^1$; $AO^2$, $AR^2$; $AO^3$, $AR^3$; $AO^4$, $AR^4$; $AO^5$, $AR^5$; $AO^6$, $AR^6$; $AO^7$, $AR^7$; $AO^8$, $AR^8$; $AO^9$, $AR^9$; $AO^{10}$, $AR^{10}$.

Arranged, in parallelism with the busses or main wires just indicated, are busses RC, OC, SB, H' and E', the latter having a counterpart $e'$ in the series of auxiliary busses, there being a connection 241 between the two. The busses OC and SB (Fig. 1) will be recognized as being the continuations of the wires OC and SB described above, by reason of the connections thereto, as shown. Running parallel with the wire OC is the reply common wire RC, which is also substantially a continuation of the bus RC by virtue of the connection 24.

A plurality of switches 25, one for each wire running to the various busses, is provided for each wire in the main or control circuit, all these switches being so connected that all will operate as one, making it impossible to open one without opening all. The double throw switches are to be so constructed that immediately upon opening one side of the switch, the other side will close. This insures an unbroken main circuit.

Arranged beneath the respective order indications $O^1$, $O^2$, etc., incidentally mentioned above, are companion reply indications $R^1$, $R^2$, $R^3$, $R^4$, $R^5$, $R^6$, $R^7$, $R^8$, $R^9$ and $R^{10}$. All of the order and reply indications consist preferably of lamps and pointers as shown in Figure 10, but obviously may consist of any other device or devices suitable for the purpose. These various indications are not in direct electrical connection with each other, but when the contactors 191 etc. bridge the front points 201, 201$^a$, etc., current is conducted either to the order indications or reply indications, depending on circumstances that are described in connection with operations Nos. 1 and 2 in Figures 2 and 3 of the drawing.

The order indications $O^1$, $O^2$, etc., are energized when an order is being transmitted from one of the order stations, and the reply indications $R^1$, $R^2$, etc., are energized when the particular order given is replied to by the receiver in the engine room. The restoring wire H is connected to the bus H', an extension of the main positive wire SB, divided into branches 26, 27, 28, 29, 30, 31, 32, 33 and 34, running in parallelism with the wire H as clearly shown in Figure 7.

Operatively associated with the wires H and positive branches 26, 27, etc., are the order switches $OS^1$, $OS^2$, $OS^3$, $OS^5$, $OS^6$, $OS^7$, $OS^8$, $OS^9$ and $OS^{10}$, which are individually depressible by the officer at the station to transmit that particular order represented by the order switch then actuated. Each order switch includes a back point and a pair of front points, the back point, against which the respective order switches rest normally, being indicated 35, 36, 37, 38, 39, 40, 41, 42 and 43.

Those of the front points connected to the restoring wire H are indicated 44, 45, 46, 47, 48, 49, 50, 51 and 52, while those connected to the respective wires 221, 222, etc., are indicated 53, 54, 55, 56, 57, 58, 59, 60, 61 and 62. In the normal position of the parts, as in Figure 7, a current path is completed from the positive wire SB through the various branches 26, 27, 28, etc. to the last order switch $OS^{10}$, by reason of the normal contact of the various order switches with the respective back points of the branch wires. The back point 43 alone performs no function, in that it is merely a stop point for the switch $OS^{10}$ and is not connected to any wire as is the case with the preceding back points.

One of the switches in the series of order switches just described, namely, the reply switch $RS^4$, is slightly different in construction from the order switches at either side. This switch $RS^4$ is connected through the wire 241 to the engine room reply bus E' in contra-distinction to the connections of the other switches to branches leading to the wire SB. The switch $RS^4$ has but a single front point 56 which is connected to the wire 224. The purpose of the switch $RS^4$ is for the reply or acknowledgement of the order "engine trouble" by the officer at the order station, while all the other switches are only for transmitting orders to the engine room.

There is a plurality of order controlling relays, each corresponding to a companion one of the respective order indications tabulated below and accordingly designated $Z^1$, $Z^2$, $Z^3$, $Z^4$, $Z^5$, $Z^6$, $Z^7$, $Z^8$, $Z^9$ and $Z^{10}$. The solenoids of the relays $Z^1$ to $Z^{10}$ are respectively energized upon transmission of an order corresponding to the depression of a particular companion order switch OS. The end relay $Z^{11}$ is not subject to control by the order switches OS, but is controlled only by the reply switches RS in the engine room instrument.

The solenoids of the respective relays $Z^1$, $Z^2$, etc. to $Z^{10}$ are connected at one side to the common wire C and at the other side to the busses $A^1$, $A^2$, etc., to $A^{10}$ through the wires 64, 65, 66, 67, 68, 69, 70, 71, 72 and 73. One side of the solenoid of the relay $Z^{11}$ is also connected to the common negative return wire C, while the other side is connected through the wire 74 to the engine room reply wire E'.

Each solenoid $Z^1$, $Z^2$, etc. to $Z^{11}$ has a movable core 75, 76, 77, 78, 79, 80, 81, 82, 83, 84, 85 each of the various cores including a plurality of circuit controlling disks or contactors. The structure of one of the relays is shown in detail in Figure 13, this being the relay $Z^2$. The disk, correctly shown as such, on the movable core 76, cooperates with the front and back points at the sides, but for purposes of clearness of illustration, those disks are shown as contactors in the diagrammatic drawings, because by so showing the disks, the various circuit paths can be more easily traced.

Arranged in horizontal series are the contactors of the S circuit, which are respectively designated $S^1$, $S^2$, $S^3$, $S^4$, $S^5$, $S^6$, $S^7$, $S^8$, $S^9$, $S^{10}$ and $S^{11}$. These normally rest against back points or contacts of connecting wires 86, 87, 88, 89, 90, 91, 92, 93 and 94, the wire 94 being connected to the contactor $S^{10}$ which merely rests against a dead back point and has no connection to the contactor $S^{11}$, which also merely rests against a dead back point.

Front points 95, 96, 97, 98, 99, 100, 101, 102, 103, 104, and 105 are engageable by the companion contactors $S^1$, $S^2$, etc. to $S^{11}$, when the respective solenoids $Z^1$, $Z^2$ etc. to $Z^{11}$ are individually energized, thereby supplying what is so termed for convenience of description, "stick" energy to that particular solenoid previously energized by the depression of its corresponding order switch, from the branch wire 106 which is capable of positive energization. The front points 95, etc. are connected to wires 242, 243, 244, 245, 246, 247, 248, 249, 250 and 251, leading from the wires 64 etc. to the contactors of the P series designated $P^1$, $P^2$, $P^3$, $P^4$, $P^5$, $P^6$, $P^7$, $P^8$, $P^9$ and $P^{10}$.

"Stick" energy is supplied to the solenoid $Z^{11}$ by a wire 107 which runs from the branch 106 to the contactor $S^{11}$. Normally, no current flows through either the wire 107 or over the "stick" circuit S by reason of the positions of the contactors of the N circuit. These contactors are arranged in a double row, and in accordance with the direction of flow of the current from right to left as will appear below, are designated $N^1$, $N^2$, $N^3$, $N^4$, $N^5$, $N^6$, $N^7$, $N^8$, $N^9$, $N^{10}$, $N^{11}$, $N^{12}$, $N^{13}$, $N^{14}$, $N^{15}$, $N^{16}$, $N^{17}$, and $N^{18}$.

A wire 108 connects the front point of the contactor $N^2$ to the back point of the contactor $N^{11}$, and incidentally it should be here noted that throughout the drawing, front contact points are to be distinguished from back contact points by the engagement of the contactors or switch arms with the back point in the normal positions of the parts. Wires 109, 110, 111, 112, 113, 114, 115 and 116 connect the respective contactors $N^2$, $N^3$, etc. $N^9$ with the front points of the companion relays $Z^9$, $Z^8$, etc. $Z^{10}$ in horizontal order. For example, the contactor $N^2$ is connected by the wire 109 with the front point of the contactor $N^3$, and so on across.

A branch 117 connects the wire 108 to the back point of the contactor $N^1$, a wire 118 connecting the front point of the same contactor to the branch connection joining the front and back points of the contactors $N^2$ and $N^{11}$. Wires 119, 120, 121, 122, 123, 124, 125 and 126 connect contactors $N^{11}$, $N^{12}$, etc. $N^{18}$ to the back points of contactors $N^3$, $N^4$ etc. $N^{10}$, all of these back points being in turn connected to the front points of the contactors $N^{11}$, $N^{12}$, etc. $N^{18}$, by short branches.

The back points of contactors $N^{12}$, $N^{13}$, etc. $N^{18}$ are connected to the wires 109, 110, etc. 115 by wires 127, 128, 129, 130, 131, 132, and 133. The M or "stand by" circuit comprises a horizontal series of contactors $M^1$, $M^2$, $M^3$, $M^4$, $M^6$, $M^7$, $M^8$, $M^9$, and $M^{10}$, wires 134, 135, 136, 137, 138, 139, 140 and 141 connecting the back points of the various contactors to the contactors next in order. For example, the back point of contactor $M^1$ is connected by the wire 134 to the contactor $M^2$ and so on across with the exception of the contactor $M^{10}$, in which case the wire 141 joins the two adjacent back points, the contactor itself being connected by means of the wire 142 to the bus $A^5$.

Disposed above the "stand by" circuit M is the safety circuit R, the contactors $R^1$, $R^2$, $R^3$, $R^4$, $R^5$, $R^6$, $R^7$, $R^8$, $R^9$, and $R^{10}$, of which are arranged in horizontal series. A branch C' from the common wire C, connects the pivotal point of all of the contactors in the R series, the front points of the respective contactors having a common connection 262 to the contactor 263 of the last relay $Z^{11}$. The back point 264, with which the contactor 263 is in normal engagement, joins the bus OC through the wire 265, the front point 266 of the contactor joining the bus RC to the wire 267.

A positive branch wire 143 runs from the main positive line wire SB to the contactor $N^1$ of the relay $Z^{10}$, by this manner of connection supplying current to the N circuit and the S circuit when one of the relays $Z^1$, $Z^2$, etc. $Z^{10}$ is actuated to properly position the companion contactors thereby shifted to close the N circuit. Current is supplied to the M circuit through the wire connection of the contactor $M^1$ to the branch wire 143.

The Q or time-recording circuit comprises the contactors $Q^1$, $Q^2$, $Q^3$, $Q^4$, $Q^5$, $Q^6$, $Q^7$, $Q^8$, $Q^9$, $Q^{10}$, and $Q^{11}$, which are all connected to the positive branch wire 143 and respectively have brush contacts 144, 145, 146, 147, 148, 149, 150, 151, 152, 153 and 154, by means of which momentary contacts are made and the time of operation of the then active companion relay in both directions, recorded on suitable recording means which is not required to be illustrated in the present connection.

Of the contactors in the Q circuit, the contactor $Q^{11}$ is the only one which has no connection to the branch 143, this contactor being connected to the wire 74 by the branch 155, to which the back point 105 of the contactor $S^{11}$ is also connected. The retractor contactor 156, in horizontal line with the top row of contactors of the N circuit but having no operative connection therewith, is joined through the wire 157 to the retractor solenoid $Z^{12}$ at the other end of the core 85 of the relay $Z^{11}$.

Upon subsequent depression of one of the order switches OS after a previously given order has been transmitted to the engine room and in turn acknowledged by the engineer, (by which act of acknowledgment the relay $Z^{11}$ becomes energized), a circuit is momentarily completed through the retractor solenoid $Z^{12}$, because the contactor 156 is then in engagement with the front point to which the wire 158 leads from the bus H', the return path of the current from the solenoid $Z^{12}$ being over the wire 159 to the common negative return C.

A contactor 263 controls the return current over the wires 265 or 267 which respectively terminate in back and front contact points 264—266 at the contactor. The wire 265 is connected to the common return OC, while the wire 267 is connected to the common return RC. The up and down movement of the contactor 263 causes the lighting and extinction of the order and reply indications O and R, as appears more fully below.

Main switches $MS^9$, $MS^{10}$ and $MS^{11}$ are so located as to be individually operative at the respective transmission stations 9, 10 and 11, these switches also being embraced by the main positive wire SB as clearly shown in Figure 1. These main switches are respectively 3-way, 4-way and 3-way, of the character disclosed by Hart and Hegeman in catalog No. 24, and in detail in my Patent Number 1,575,599, the arrangement being such that the current can be turned on by merely operating any one of the switches at any one of the stations.

The receiving instrument in the engine room is to be considered next. It is shown in detail in Figs. 8, 12 and 13, wherein parts corresponding in construction and operation to similar parts in the transmitting instruments, of which the first one is described above in connection with Figure 7, are to be recognized by similar reference characters. A difference in the receiving instrument over the transmitting instruments consists of the provision of a plurality of reply switches respectively designated $RS^1$, $RS^2$, $RS^3$, $RS^5$, $RS^6$, $RS^7$, $RS^8$, $RS^9$, and $RS^{10}$. The purpose of these switches is to enable the engineer to reply to or acknowledge orders transmitted to him.

The engineer can transmit only one order, i. e. "engine trouble", by means of the order switch $OS^4$, the circuit connections of which are so arranged that precedence is given over any order then up on any board. The order switch $OS^4$ (Fig. 2) has a front point 163, in association with the front point 56, which is connected to the bus H′ by the wire $H^2$. The order switch $OS^4$ also has a direct connection to the main positive wire SB through the wire 164. As in the case of any of the transmitting instruments 9, etc., the order and reply indications $O^1$, $R^1$ etc. of the engine room receiving instrument 12 have individual wires at one side, leading off to a point of control by a single contactor. This is shown very clearly in Figure 12. The order indications $O^1$, $O^2$ etc. have wires 268, 269, 270, 271, 272, 273, 274, 275, 276 and 277 individually leading to front points 278, 279, 280, 281, 282, 283, 284, 285, 286 and 287 of the contactors $P^1$, $P^2$ etc. Companion front points 288, 289, 290, 291, 292, 293, 294, 295, 296, 297 are connected by wires 298, 299, 300, 301, 302, 303, 304, 305, 306, 307 to the reply indications $R^1$, $R^2$ etc., companion to the order indications mentioned above. Wires 308, 309, 310, 311, 312, 313, 314, 315, 316, and 317 join the front points 53, 54, 55, 56, 57, 58, 59, 60, 61 and 62 of the reply switches $RS^1$, $RS^2$, etc. to the busses $A^1$, $A^2$ etc., on the same order that the front points 53, 54, etc. of any sending instrument are connected to the same busses by means of the wires 221, 211; 222, 212; etc.

Attention is next directed to the detailed description of one transmitting instrument, illustrated in Figures 8, 9, 10 and 11. The mechanism is contained in a suitable casing 165, preferably made of metal, provided with a suitable flange 166 by means of which the casing is attached in a convenient position, and having a door 167 suitably arranged to make an air and water-tight closure. The door is hinged at 168 and has suitable clamping means 169 through which the door is firmly clamped over the opening of the casing. There are twenty openings in the door 167, corresponding in number to the order and reply indications in Figure 7. Strips or portions 170, 171, and 172, separate and define the various openings vertically, the portions 170, 172 providing the necessary support for mounting the order switches $OS^1$, $OS^2$, $OS^3$, $OS^5$, $OS^7$, $OS^{10}$, $OS^9$, $OS^8$, $OS^6$ and $OS^4$. The upper row of five of these switches is associated with the following indications under the legend "*Ahead orders.*"

$O^1$ Full.
$O^2$ Half.
$O^3$ Slow.
$O^5$ Stand by.
$O^7$ Finished with engine.

Each of the above orders has a corresponding reply indication $R^1$, $R^2$, $R^3$, $R^5$, and $R^7$. The remaining order and reply indications are located in the lower path of the door 167 above the legend "*Astern orders*"

$O^{10}$ Full.
$O^9$ Half.
$O^8$ Slow.
$O^6$ Stop.
$O^4$ Engine trouble.

Each of these orders has the corresponding reply indications $R^{10}$, $R^9$, $R^8$, $R^6$, and $R^4$, the various order and reply indications being painted or otherwise applied to the translucent panes 173 in the openings in the door.

Prominence is given that particular order represented by the order switch depressed by the operator, by the lighting of the lamp behind the opening bearing the order legend then in operation. One or more lamps can be placed behind each legend, only one lamp being shown, however, in each case in Figure 10.

Electro-magnets 174, 175 are placed in circuit with the order and reply indication lamps $O^1$, $R^1$, so that when the respective lamps are lighted the companion electro-magnets are energized to attract the armature 176 of the pointers 177, 178. The pointers are resiliently mounted at 179, the pointers in fact being a part of the resilient strip. 179. Emphasis is laid on the importance of using pointers in addition to the lamps. The latter are fragile in that the filaments are more likely to break, but the pointers will indicate under all ordinary circumstances.

If, for example, the order O¹ is brought into prominence by lighting of the lamp, the magnet 174 will be energized attracting the armature 176 and elevating the pointer 177 to more clearly designate the "full" order. The order switches may be of any desired construction, Figure 11 showing one form, the various front and back contact points being recognized as being the same as those described in connection with the first unit in Figure 7. The switch structure is preferably enclosed in an air-tight casing 180, because the main current is not broken by these switches.

One relay Z is shown in detail in Figure 13. This is the relay Z², arbitrarily selected from the bank of relays in Figure 7. All of the relays are substantially alike, it being noted, however, that the relay Z⁵ in Figure 7 is minus a contactor in the M or "stand by" circuit, the purpose of this omission being to prevent the breakage of the M circuit when the relay Z⁵ is automatically energized by the initial closure of one of the main switches MS⁹, etc.

The solenoid Z² of the relay in Figure 15 is suitably vented at 181, in accordance with approved modern construction, and is contained in an insulated case 182. This case may be surrounded by a strap of iron 182ᵃ, all mounted on top of the contact housing 183, in which the various contacts and contactor disks are located. In the actual construction of the relay, as in Figure 13, the contactors S², N⁹, N¹⁸, R², M², Q² and P², designated as such for convenience of illustration, consist of disks bearing the same reference characters, and affixed to the core 76 of the solenoid.

Each contactor disk has cooperating front and back points collectively designated 184 and 185, with the exception of the front points of the disks S², Q² and P², the front points of which have been referred to above as 96, 145 and 279—289 respectively. The front and back points consist of resilient contact strips which are respectively fastened at 186—187 to the casing 183 at each side of a common stop 188 between said contacts.

The arrangement of the front and back points makes a novel form of contact breaker, it being understood at once that considering the core 76 to move upwardly, the back points 185 at each side will follow the disk S² until the stops 188 are reached, whereupon the disk S² will have but a short distance to travel before the front points 96 are engaged. The relay Z² is removed from the companion order switch OS², and therefore removed from the places where the main current is broken, it naturally following that the order switches OS of the transmitting instruments can be housed in airtight casings because the escape of gases attending circuit breaking will not have to be provided for in said instruments.

A spring 189, or other equivalent means, is attached to the lower end of the core 76 so as to retard the upward movement thereof when the solenoid Z² is energized, but to hasten the return of the core when said solenoid is deenergized. The relays Z are therefore retarded in picking up but are quick in returning. The retractor solenoid Z¹² in Figure 7, is merely an auxiliary to the spring 189, insuring the return of the core should the companion spring fail to make the return. If desired, both springs and retractor solenoids may be employed in connection with each of the relays Z. The spring 189 in Figure 13 is adjustable in tension by the wing nut 190 at the bottom.

The operation comprises five major acts which are described below in regular order, beginning with automatically ordering the "stand by" indication. Consider Figure 2. In this figure, and in Figures 3, 4, 5, and 6 following, the active lines and devices are indicated in heavy lines. Normally, the entire system is "dead", that is to say, current flows on none of the lines. The officer on the navigating bridge 9 turns the main switch MS⁹ of that transmitting instrument, whereupon current flows from the positive pole of the source of energy over the main line wire SB, including the bus SB, the ultimate effect of this initial current being to ring the order bells OB of all bridges and the engine room, returning via the order common wires OC to the bus OC, over wire 265 and through the safety circuit R, and finally to the negative pole of the source of energy. But before this ringing of the bells OB can be accomplished, the main and auxiliary relays Z⁵ and ZA⁵ must be energized, the actions now in the course of description taking place substantially simultaneously so that the energization of these relays, the ringing of all order bells OB, and the lighting of all order indications O⁵ take place at once as the result of closing the main switch.

All order indications O⁵ (stand by) are lighted by the energization of relays ZA⁵ in this manner and it is clear that the purpose of the invention becomes apparent: Current enters the branch 143 from the main line wire SB, flowing over the M circuit comprising the contactors M¹, M² etc. M¹⁰, reaching the wire 142 and flowing to the bus A⁵, from whence it flows via wires 215 and 225 to the relay ZA⁵, returning to the negative pole of the source of energy over the common return wires C.

Upon the energization of relay ZA⁵ the attraction of the contactor 195 takes place, bridging the adjacent front points of the wires 18 and 235, and providing a circuit for current to the signal $O^5$ only, all other signals being isolated. Simultaneously with the energization of the relay $ZA^5$, the relay $Z^5$ became energized in this way:

Current flows from the bus $A^5$ over wire 68, through the solenoid $Z^5$ returning via the negative return wire C. The core 79 is thus attracted, lifting the armatures $S^5$, $N^6$, $N^{15}$, $R^5$, $Q^5$ and $P^5$ from contact with the respective back points, into engagement with the various front points. The armature $Q^5$ operates to mark the time of lifting of the core 79 by virtue of the operatively associated time recording mechanism.

The armatures 195 and $R^5$ of the relays $ZA^5$ and $Z^5$ respectively being up, current flows as follows: Current flows from the bus $A^5$ over wire 215 to the armature 195, front point 205, wire 18 to the auxiliary bus $AO^5$, continuing from there over all wires 18 to the various order indications $O^5$, returning via the order common wires OC to the bus OC, down wire 265 to the back point 264 of the relay $Z^{11}$, through the armature 263 and over the wire 262 of the primary safety circuit to the armature $R^5$, then returning to the negative pole of the source of energy via the common wire C.

Another circuit is employed in connection with the "stand by" order $O^5$ in the engine room, since it is to be observed that the auxiliary busses $AO^1$ etc. are common only to the transmitting instruments. The engine room order $O^5$ is energized in this way: The core 79 of the relay $Z^5$ still being attracted and all armatures being up, current flows from the bus $A^5$ over wires 68 and 246 to the contactor $P^5$ of the secondary safety circuit, entering the wire 272 at the front point 282, then flowing through the order indication $O^5$, returning by way of the order common wire OC, finally finding its way to the negative pole of the source of energy with the current that has been described as flowing through the primary safety circuit R via wire 265, back point 264, contactor 263, etc.

All order indications $O^5$ are now energized throughout the system and the order "stand by" is rendered prominent by reason of the lighting of the lamps therebehind. The engineer is thus admonished to pay attention and wait for an ensuing order. The reply indications $R^5$ are not energized by the attraction of the contactor 195 of the relay $ZA^5$, because tracing the necessary current path via wires RC and 24, bus RC and wire 267, finds an end at the front point 266 of the relay $Z^{11}$, which front point is open and hence current cannot get back to the common wire C. For the same reason, the reply indication $R^5$ in the engine room cannot become energized because a tracer along wire 302 from the armature $P^5$, and then along wire 24 from the return common wire RC of the engine room, will end at the front point 266 of the relay $Z^{11}$.

Mention was made of recording the time of operation of the relay $Z^5$ by means of mechanism in connection with the contactor $Q^5$. This mechanism is conventionally shown in connection with the relay $Z^1$ in Figure 1 and comprises a clock-operated paper dial $d$ on which the time of giving an order, and replying thereto, is impressed by markers, $m$, $m'$. These are mounted on the armature $a$. When the magnet $m^2$ is energized by operation of the relay, the marker $m'$ records the time, and when the relay and the magnet $m^2$ are deenergized, the marker $m$ records the time.

The N circuit is energized to hold the core 79 up by the lifting of the contactor $N^6$, current then flowing from the positive pole of the source of energy over wire SB to branch 143 and over this path: contactor $N^1$, wire 117, wire 108, contactor $N^{11}$, wire 119, contactor $N^3$, wires 110—128, contactor $N^{13}$, wire 121, contactor $N^5$, wire 112, contactor $N^6$, wire 131, contactor $N^{16}$, wire 124, contactor $N^8$, wire 133, contactor $N^{18}$, wire 126, and contactor $N^{10}$ to wire 106, from thence flowing over the contactors $S^1$, $S^2$, $S^3$, $S^4$, and $S^5$ of the "stick" circuit to the front point 99, through solenoid $Z^5$, back to the negative pole of the source of energy over the common negative return wire C.

"Stick" energy is thus supplied to the solenoid $Z^5$ so that the core 79 remains up and the various contactors associated therewith remain in the position shown in Figure 2, until another order is issued from a transmitting instrument. The order bells OB are still ringing and all order indications $O^5$ (stand by) are still lighted.

The engineer's reply stops all order bells ringing and extinguishes all order indications $O^5$, but lights all reply indications $R^5$, thus constituting the acknowledgment of the "stand by" order. Consider Figure 3. In replying, the engineer presses the reply switch $RS^5$, whereupon current flows from the bus $A^5$ (which is still energized by virtue of the flow of current from the positive pole of the source of electrical energy, over wire SB, branch 143, the contactors $M^1$, $M^2$ etc. $M^{10}$ of the M circuit, and wire 142) over wire 312 to the front point 57, through switch $RS^5$ to the engine room reply wire E, bus E', wire 74 to the solenoid $Z^{11}$, and from thence to the negative pole of the source of energy via the common return C. The solenoid $Z^{11}$ being energized, attracts the core 85 consequently lifting the contactors $S^{11}$, 156, 263, and $Q^{11}$ into engagement with the respective front points. The contactor $Q^{11}$ makes record of the time of lifting of the core by virtue of its association with the time recording mechanism.

All order bells are silenced and all order indications $O^5$ are extinguished by the lifting of the contactor 263 at the depression of the reply switch $RS^5$, since the formerly active order common return wire OC is now broken at the back point 264 of the wire 265, thus severing return communication of the current to the common negative return wire C, from the order common wire OC connected to the indications $O^5$ and order bells OB. Also, upon depression of the reply switch $RS^5$, current flows through the reply indication $R^5$ in the engine room in this manner: Current flows from the positive bus $A^5$, down wire 68, order wire 246 to the contactor $P^5$, front point 292 to the wire 302, thence through the reply indications $R^5$ and returning to the negative pole of the source of energy via the wires RC and 24 to the point of connection to the bus RC, wire 267 and front point 266 to the contactor 263 of relay $Z^{11}$, over wire 262 of the safety circuit to the raised contactor 256 and wire C' to the bus C.

Bear in mind that it is the depression of the engineer's reply switch $RS^5$ which causes the foregoing passage of current through the reply indication $R^5$. The depression of this switch caused the energization of the relay $Z^{11}$ for the completion of a current path from the reply indication $R^5$ at the front point 266 of the contactor 263, and the prior energization of the relay $Z^5$ made it possible to complete the circuit path at the front point 292 of the contactor $P^5$. No current can flow through the companion order indication $O^5$ in the engine room, because the lifting of the contactor 263 broke the path necessary for the return of the current to the common wire C.

In addition to the lighting of the reply indication $R^5$ in the engine room, all other reply indications $R^5$ are lighted in this manner: Current flows from the bus $A^5$ (still energized by current flowing from main wire SB, branch 143 and the intact M circuit) over wire 215 to the contactor 195 of the auxiliary relay $ZA^5$ (still energized by the passage of current from bus $A^5$ to $ZA^5$ via wire 215 and common wire and bus C) over wire 235 to the reply indication $R^5$ (for example of the navigating bridge 9) returning to the negative pole of the source of energy via wires RC and 24 to the bus RC, thence over wire 267 and the same current path described in connection with the reply indication $R^5$ of the engine room.

Positive current from the wire 235 leading from the relay $ZA^5$, is carried to all other transmitting instruments by the auxiliary bus $AR^5$.

All reply indications $R^5$ throughout the entire system, remain lighted by virtue of the following means, until an ensuing order is given: "Stick" energy is supplied to the solenoid $Z^{11}$ to keep the core 85 up and the contactor 263 in contact with the front point 266 of the wire 267, thereby keeping the return path of current from the reply indications $R^5$, via wires RC, 24, bus RC, wire 267, contactor 263, the safety circuit R, wire C' and bus C, intact after the reply switch $RS^5$ is released by the engineer. This "stick" energy for the solenoid $Z^{11}$ flows from the positive pole of the source of energy, over wire SB, branch 143, the various contactors and wires of the N circuit described in connection with Figure 2, finally reaching the wire 106, from thence flowing over wire 107 to the contactor $S^{11}$ to the front point 105, a portion of wire 155, through solenoid $Z^{11}$ to the negative pole of the source of energy via the common return wire C. The solenoid $Z^5$ is still energized from the initial operation of issuing the "stand by" order through the act of turning the main switch $MS^9$, and consequently the N circuit remained complete for the passage of current to the "stick energy" wire 107, as just described.

The "slow" order is issued from the transmitting instrument on the navigating bridge 9, or any other transmitting instrument throughout the ship, by depressing the order switch $OS^3$ (see Figure 4), whereupon these actions take place substantially simultaneously: (1) The relay $ZA^3$ is energized, (2) the solenoid $Z^3$ is energized, (3) all order indications $O^3$ and order bells OB throughout the ship are lighted and rung, (4) the "stick" circuit S for solenoid $Z^5$ is broken, (5) the N circuit is momentarily broken to deenergize the solenoid $Z^{11}$, and (6) the solenoid $Z^{12}$ is momentarily energized to retract the core 85. The foregoing actions are now described in detail.

(1) Upon depressing the order switch $OS^3$, so that the switch rests against the front points 55, 46 current flows from the positive pole of the source of energy over the positive main line wire SB to the switch $OS^3$ over the branches 26, 27 and 28 to the front point 55, wire 223 to the relay $ZA^3$, returning to the negative pole of the source of energy via the bus C. The contactor 193 is attracted. The bus $A^3$ is energized by virtue of current flowing down the wire 213 from its point of connection to the wire 223.

(2) The solenoid $Z^3$ is energized by the passage of current from the bus $A^3$ over the wire 66 to said solenoid, returning to the negative pole of the source of energy via wire and bus C. As a result of the energization of $Z^3$, the core 77 is drawn up and the various contactors $S^3$ etc. are moved into contact with their front points 97 etc. The contactor $Q^3$, of the time recording mechanism, marks the time when the core 77 was raised.

(3) All order indications $O^3$ and order bells OB throughout the ship are actuated, current for the latter flowing thus: from the main positive wire SB or bus SB, to the order bells OB, returning to the negative pole of the source of energy via the return wires OC, bus OC, wire 265 past the back point 264 of relay $Z^{11}$, over the contactor 263 and wire 262 of the safety circuit R, contactor $R^3$ (now raised to engage the front point) wire C' and bus C.

Current for the energization of the former (indications $O^3$) flows from the bus $A^3$ up wire 213, contactor 193, front point 203 and wire 16 to the indication $O^3$, returning via the order common wire OC and bus OC. Energy is supplied the auxiliary relay $ZA^3$ over wire 213 from the bus $A^3$, the lower portion of wire 223, returning to the negative pole of the source of energy via the common wire C. It is by this last circuit that the contactor 193 is held up to keep the adjacent front points closed for the completion of the order indication circuit.

(4) The "stick" circuit S for the solenoid $Z^5$ is broken at the back point of the contactors $S^3$ when the later was lifted upon the elevation of the core 77. Since current cannot flow to the solenoid $Z^5$, it naturally follows that its core 79 must fall and consequently drop all of its contactors $S^5$ etc. leading the current from the branch 143 to the "stick" circuit S over a contactor path different from that shown in Figures 2 and 3. (See Fig. 4.)

It is to be observed that the path of the current through the N circuit is the same in Figure 4 as in Figure 2 until it reaches the relay $Z^5$ where it is shunted from passage through the contactors $N^6$ to passage through the contactors $N^{15}$, by reason of the deenergization of the solenoid $Z^5$ explained above. The N circuit would be broken were it not for the picking up of the contactors $N^8$ of the relay $Z^3$, which act again completes the N circuit so that current is conducted to the solenoid $Z^3$, holding the core 77 up and thereby keeping the bus wire $A^3$ energized until the engineer replies to the order $O^3$ ("slow").

The bus $A^5$, which up to the time of the depression of the order switch $OS^3$ supplied energy for the lighting of the reply indications $R^5$ in Figure 3, is deenergized or severed from communication with the positive pole of the source of energy, by the lifting of the contactors $M^3$ from the back point of the wire 136 at the raising of the core 77. The M circuit being broken at this point, current no longer flows to the bus $A^5$ and consequently the reply indications $R^5$ are extinguished.

(5) The N circuit is momentarily broken to deenergize the solenoid $Z^{11}$ at the contactor $N^6$ upon the deenergization of the solenoid $Z^5$ and consequent return of the core 79. This breaking of the N circuit severed the passage of current to the solenoid $Z^{11}$, so that that solenoid became deenergized and the core 85 fell to its normal lowermost position. This falling or returning of the core 85 breaks the return path of the current from the reply indications $R^5$ (in Figure 3 for example) at the contactor 263 and front point 266. But as stated before, the N circuit is re-established upon the lifting of the core 77 of solenoid $Z^3$, when the contactor $N^8$ is moved into contact with the adjacent front point of the wire 114.

(6) The solenoid $Z^{12}$ is momentarily energized to retract the core 85, for the purpose of avoiding any failure of operation of the relay $Z^{11}$ by sticking, breaking of the spring 189 in Figure 15, etc. The reader can readily see that it is absolutely necessary for the core 85 to shift, if for no other purpose than to extinguish the reply indications $R^5$ by the breaking of the return circuit at the contactor 263. The solenoid $Z^{12}$ at the bottom operates to positively retract the core. This solenoid is energized by the passage of current from the positive pole of the source of energy, over wire SB, branches 26, 27 and 28, to the switch $OS^3$, front point 46 and over the restoring wire H to the bus H', wire 158 to the contactor 156, wire 157, through solenoid $Z^{12}$, returning to the negative pole of the source of energy via wires 159 and C. The momentary nature of the energization of solenoid $Z^{12}$ can be understood at once when the reader considers that it is only while the contactor 156 is up that there can be a passage of current to the bottom solenoid. The instant a current is passed through the path including the contactor 156, there is an instant response by the solenoid $Z^{12}$ resulting in the breaking of that path at the contactor 156.

The officer on the navigating bridge 9 has by this time released the order switch $OS^3$, (Figure 5) but the solenoid $Z^3$ is still energized, the core 77 still being raised, and all order bells OB are still ringing with the corresponding order indications $O^3$ ("slow") still prominent throughout the system. The engineer must now reply to the "slow" order. Consider Figure 5. The engineer makes his reply by depressing his reply switch $RS^3$, whereupon: (1) The solenoid $Z^{11}$ is energized and actuated to silence all order bells and extinguish all order indications $O^3$, (2) all reply indications $R^8$ are lighted, and (3) "stick" energy is supplied to the solenoid $Z^{11}$ and the relay $Z^3$ remains up.

(1) The engineer presses the reply switch $RS^3$ so that it engages the front point 55, whereupon current flows from the positive pole of the source of energy over the main positive line wire SB, branch 143, the contactors and wires of the N circuit, designated in heavy lines in Figure 5 and described in connection with Figure 4, finally reaching the wire 106, and from thence flowing over the S circuit comprising contactor $S^1$, wire 86, contactor $S^2$, wire 87, contactor $S^3$, front point 97, wire 66 to the bus $A^3$, thence up the wire 310 to the front point 55. over switch $RS^3$, wire E, bus E′, wire 74, through solenoid $Z^{11}$ and back to the negative pole of the source of energy via the common return wire C.

The solenoid $Z^{11}$ being thus energized, attracts the core 85 so that the contactor 263 no longer rests on the back point 264, (thereby maintaining the return path for the current flowing from the order indications $O^3$ and order bells OB in Figure 4,) but now engages the front point 266 of the wire 267 so that the current flows thus:

(2) From the positively energized wire 244 (which receives current from the positive pole of the source of energy over wire SB, branch 143, the contactors and wires of the N circuit, wire 106, the contactors and wires of the S circuit, reaching the wire 244, there dividing) contactor $P^3$, front point 290, wire 300 to the reply indication $R^3$, returning via wire 24 to the bus RC, down wire 267, contactor 263 of relay $Z^{11}$, the wire 262 and contactor $R^3$ of the safety circuit, finally reaching the common return wire C over the wire C′ of the safety circuit.

The circuit described in the preceding paragraph supplies current to the reply indication $R^3$ of the engine room only, but the reply indications $R^3$ of the transmitting instrument are supplied thus: from the positively energized bus $A^3$ over wire 213 to the contactor 193 of the auxiliary relay $ZA^3$, up wire 233 to the auxiliary bus $AR^3$, thence up to all reply indications $R^3$, returning to the negative pole of the source of energy via wires 24, bus RC, wire 267 and the safety circuit recently described, and wire C. The reply indications $R^3$ are alone visible throughout the ship and thus indicate the engineer's reply to the previous order given in Figure 4.

The act of shifting the contactor 263 thus causes the silencing of the order bells OB and the extinction of all order indications $O^3$, and the lighting of all reply indications $R^3$. The time of operation of the relay $Z^{11}$ is recorded by the raising of the contactor $Q^{11}$ at the lower end of the core 85, a similar time recording act being accomplished at the raising of each one of the cores of the various relays, as described for example in connection with relay $Z^3$.

(3) "Stick" energy for the solenoid $Z^{11}$ is supplied by the raising of the contactor $S^{11}$ into engagement with the front point 105, whereupon current flows from the positive pole of the source of energy, over the wire SB, branch 143, the contactors and wires of the N circuit, wires 106—107 to the contactor $S^{11}$, front point 105, through solenoid $Z^{11}$, returning to the negative pole of the source of energy via the common return wire C. The cores of the relays $Z^3$ and $Z^{11}$ remain up until a subsequent order is issued, the energization of the solenoid $Z^3$ being necessary to maintain the circuit to the reply indications $R^3$ throughout, and the energization of the solenoid $Z^{11}$ being necessary to maintain the complete return path.

Should it happen that the engineer fails to heed the "slow" signal after having replied by depressing his reply switch $RS^3$, the officer on the navigating bridge, or on any of the other bridges, whence the signal originated, can again depress his order switch $OS^3$ whereupon (1) all order indications $O^3$ and all order bells OB are made to again come into prominence and ring, and (2) the reply indications $R^3$ set up by the engineer, are extinguished.

(1) The second depression of the order switch $OS^3$, just referred to, would cause current to flow from the positive main line wire SB, which leads from the positive pole of the source of energy, over the branch wires 26, 27 and 28 (see Fig. 7) to the switch $OS^3$, over front point 46, restoring wire H, bus H′, wire 158 to the contactor 156 (now raised into engagement with the adjacent front point by virtue of the energization of solenoid $Z^{11}$) down wire 157 to the bottom solenoid $Z^{12}$, returning to the negative pole of the source of energy via wires 159 and C.

There is now an instant when both solenoids $Z^{11}$ and $Z^{12}$ are energized, but the solenoid $Z^{12}$ will predominate because of the retracting influence of the spring 189 which lends its weight toward pulling the core 85 down. The contactor 263 will thus be disconnected from the front point 266 of the wire 267 which leads from the reply common wire RC over which the current returns from the reply indications $R^3$ in Figure 5. Since this return path is now broken, the reply indications $R^3$ are necessarily extinguished, but a path is completed between the contactor 263 and the back point 264 of the wire 265, so that the order indications $O^3$ are again lighted, current flowing thus:—

(2) The bus $A^3$ being still energized by virtue of the passage of current from the positive pole of the source of energy over the contactors and wires of the N circuit, and the contactors and wires of the S circuit, front point 97 and wire 66 in Figure 5, will supply current to all order indications $O^3$ via wire 213, contactor 193 of the auxiliary relay $ZA^3$, wire 16, auxiliary bus $AO^3$, order indication $O^3$, returning via the order common wires OC and bus OC, wire 265, back point 264, contactor 263, the safety circuit R, finally reaching the common wire C via wire C′. All order bells OB will also ring because of the completion of a path from the wire SB via the order common wires OC. The reply indications R³, set up by the engineer, have now been extinguished and the subsequent order (repeated at one of the transmitting stations) now predominates.

The "engine trouble" order is the only one that the engineer is capable of sending, and this order when issued from the engineer's receiving instrument will instantly register on all transmitting boards, taking precedence over any order that may be up. Consider Figure 6. The engineer presses his order switch OS⁴, which it will be observed, is like the order switches of the transmitting instruments but is unlike his reply switches in that the latter have only one front point whereas his order switch OS⁴ has two front points. The depression of the order switch OS⁴ (1) energizes the relay Z⁴, (2) lights all order indications O⁴ and rings all order bells OB, (3) momentarily breaks the N circuit to deenergize the relays Z³ and Z¹¹, and (4) momentarily energizes the relay Z¹² to positively retract the core 85.

(1) Z⁴ is energized by a flow of current from the positive pole of the source of energy over wire SB, bus SB and wire 164 to the engineer's order switch OS⁴, front point 56, down wire 311 to the bus A⁴, thence down wire 67 to the solenoid Z⁴, returning to the negative pole of the source of energy via the common wire C. The solenoid Z⁴ being energized, raises the core 78.

(2) The bus A⁴, being energized and remaining so by virtue of the raised position of the core 78 of the solenoid Z⁴ as appears more fully below, supplies current to all order indications O⁴ as follows, the engine room order indications O⁴ being considered first, the transmitting instrument order indications O⁴, second: first, the raising of the contactor P⁴ causes current to flow from the positive bus A⁴, wires 67 and 245 to the front point 281, over wire 271 to the engine room order indication O⁴ returning to the negative pole of the source of energy via the order common wire OC, wire 265, back point 264 (of relay Z¹¹) contactors 263—R⁴ of the safety circuit, and common wires C'—C to the bus C.

Second, all other order indications O⁴, i. e. of the transmitting instruments, are energized by current flowing from the bus A⁴ up wire 214 to the wire 224, down the lower portion thereof to the auxiliary relay ZA⁴, thence to the common return wire C.

The energization of auxiliary relay ZA⁴ attracts the contactor 194, so that a part of the current flowing over wire 214 enters wire 17 by way of the front point 204, and flows through the order indication of the navigating bridge 9, returning via the order common wire OC, bus OC, finally reaching the negative pole of the source of energy via the safety circuit R described immediately above. The remaining order indications O⁴ are similarly energized by virtue of current flowing from wire 17 over the auxiliary bus AO⁴, thence up to the various order indications and returning to the negative pole of the source of energy via the path just described.

All order indications O⁴ (indicating engine trouble) are now prominent throughout the system. In addition to this, all order bells OB are ringing by virtue of the passage of current from the positive bus SB to the order bells, returning via the order common wires OC whence it merges with the common negative current stream described in several connections above.

(3) The passage of "stick" current through the solenoid Z³ in Figure 5, was broken by the raising of the core 78 of the relay Z⁴. This occurred upon the momentary opening of the N circuit at the contactor N⁷ so that current could no longer flow over the remaining portion of this circuit to the solenoid Z³, whence, being thus deprived of current, released the core 77, which dropped to the original position.

This momentary opening of the N circuit also deprived the solenoid Z¹¹ of "stick" energy, so that the core 85 has to drop, consequently opening the current return path from the reply indications R³ at the contactor 263, but establishing a return path for the current from the order indications O⁴, as described above.

(4) The return of the core 85 was insured by the passage of current through the solenoid Z¹² when the engineer's order switch OS⁴ engaged the front point 163, whereupon current flows as follows: from the positive pole of the source of energy over wire SB, bus SB, wire 164, order switch OS⁴, front point 163, restoring wire H, bus H', wire 158, contactor 156, wire 157, solenoid Z¹², returning to the negative pole of the source of energy via branch 159.

The features of advantage of that portion of the invention which differs from my copending application is briefly summarized thus:—

The auxiliary relays ZA, in conjunction with the armatures R of the primary safety circuit, positively prevent the passage of current through any indication excepting the one intended to be rendered prominent on the instrument boards. In other words, there can be no divided flow of current through any of the indications, to cause a possible glow in ones adjacent to a particular indication then rendered prominent.

While the construction and arrangement of the improved ship telegraph as herein described and claimed, is that of a generally preferred form, obviously modifications and changes may be made without departing from the spirit of the invention or the scope of the claims.

I claim:—

1. A telegraph comprising a plurality of transmitting stations and a receiving station, companion admonitory and reply signals in each of the stations subject to undesirable sympathetic operation upon operation of a selected set of signals, a source of current, and a conductor connected with said source of current; means to confine operation to the selected admonitory and reply signals comprising individual current paths connecting said conductor to the admonitory signals of the transmitting stations, a current path connecting said conductor to the receiving station admonitory signal, an auxiliary relay inserted with said conductor and controlling the passage of current from said conductor over said current paths to all transmitting station admonitory signals only, a main relay in circuit with said conductor controlling the passage of current from said conductor over said current paths to the receiving station admonitory signal, a switch connected in said conductor being closed to energize said conductor and thereby actuate both relays and send current through the respective admonitory signals controlled thereby, and control means local to the receiving station operable to extinguish all admonitory signals and complete other current paths from the respective relays to the companion reply signals and render them active in all stations.

2. A telegraph including a plurality of transmitting stations and a receiving station, each station having a plurality of pairs of companion order and reply signals subject to undesirable sympathetic operation upon operation of a selected set of signals, and a source of current having a conductor connected with the negative terminal thereof; means to confine operation to the selected order and reply signals comprising a series of main relays of which there is one for each similar pair of signals in all of the stations, each relay having a pair of contactors, a single front point for the first of the pairs of contactors each front point being connected with one end of the respective relay winding and with the second contactor of the pair, a pair of front points associated with said second contactors, wires connecting one side of the respective order and reply signals in the receiving station with the various pairs of front points, a plurality of auxiliary relays there being one for each similar pair of signals in all of the stations, each auxiliary relay having a contactor and a pair of associated front points, wires making common connection of one side of the respective order and reply signals in the transmitting stations with the said various pairs of front points, a bank of switches arranged upon independent closure to complete current paths through all order signals of the kind corresponding with the closed switch each having front points connected with one end of the windings and with the contactors of the auxiliary relays and with the aforesaid ends of the respective main relay windings, and back points connected with the succeeding switches, a conductor from the positive terminal of said source of current connected with the first contactor of the pair of contactors of the first main relay and with the first switch of said bank, and wires connecting the remaining ends of the main and auxiliary relay windings to the negative conductor.

3. A telegraph including a plurality of transmittitng stations and a receiving station, each station having a plurality of pairs of companion order and reply signals subject to undesirable sympathetic operation upon operation of a selected set of signals, said receiving station signals having corresponding switches, a series of main energized busses; means to confine operation to selected order and reply signals comprising a plurality of main relays having windings respectively connected to individual main busses, an auxiliary series of busses joining similar order and reply signals and order switches of all transmitting stations, a set of auxiliary relays having connections to individual main busses for the conveyance of current to said auxiliary busses and consequently to all transmitting stations, means embodied in each main relay and including associated elements for conducting current from the respective energized main busses to companion signals of the receiving station, direct connections between the various switches and the respective main busses, and means embodied in each main relay for producing a circuit closure either for all order signals or all reply signals.

4. A telegraph including a receiving station having companion pairs of order and reply signals subject to undesirable sympathetic operation upon operation of a selected signal, a source of current; means to confine operation to a selected signal comprising a plurality of main relays individually corresponding to pairs of signals each relay including a contactor movable against a pair of front points having individual connections leading to the respective order and reply signals of a pair and providing conductors of positive current from said source, and another main relay having a contactor embraced by a safety circuit common to all main relays said contactor being movable to either one or another of two contact positions having current return connections with said source for closing a return current path over said connections from either order or reply signals to said source.

5. A telegraph including a receiving station, companion pairs of order and reply signals situated in said station, a source of current; means to prevent undesirable sympathetic operation of associated signals upon operation of a selected signal comprising a conductor connected to the negative terminal of said source of current, a plurality of relays there being one for each pair of signals, each relay having a contactor connected to one end of the respective relay winding and to the negative conductor, a pair of front points associated with each contactor, wires connecting one side of the respective order and reply signals of each pair with the various pairs of front points, a distant bank of selector switches each having front points connected with the remaining ends of the respective relay windings and back points connected with the succeeding selector switches, a conductor connected with the positive terminal of said source of current and with the first switch of said bank, another relay having a contactor connected with said negative conductor and a winding one end of which is connected with said negative conductor, a back point in common connection with the remaining sides of the order signals and against which said contactor normally rests to complete a current return path from the order signals, a front point associated with said contactor being in common connection with the remaining sides of said reply signals, and a switch local to the receiving station having one terminal connected with the remaining end of said other relay winding and the other terminal connected with said positive conductor being closable to energize said other relay and complete a current return path from the reply signals.

6. A telegraph including a plurality of transmitting stations having signals, a receiving station having similar signals, a main current feeder having a connected source of current and a switch, means by which the supply of current to the positive side of a selected one of the signals in each of the transmitting stations is confined to such selected signals upon energization of said feeder from said source by closure of said switch, and means operated upon energization of said feeder for supplying current from said feeder to the positive side of the corresponding signal and confining the supply of current to such signal in the receiving station thereby completing a selected signal group and simultaneously completing a current path from the negative side of the selected signals in all of the stations.

7. A telegraph including a plurality of transmitting stations and a receiving station, a plurality of signals of various kinds in each station subject to sympathetic operation upon operation of a selected signal similar ones of which form corresponding signal groups in all of the stations, positive current conductor means including a plurality of main busses common to all stations; means to confine operation to selected signals comprising a plurality of auxiliary busses common to the transmitting stations, a common current return conductor, a set of main relays the windings of which are individually connected with separate main busses and the common current return conductor, a set of auxiliary relays the windings of which are individually connected with individual auxiliary busses and the common current return conductor, means to energize a selected main bus from said positive current conductor means and thereby energize the respective main relay then as a result the respective auxiliary relay and auxiliary bus, separate connections from each auxiliary bus to the respective signals in the transmitting stations thereby energizing a selected signal group, switches for the receiving station signals being associated with and individually operable by the main relays, said energized main relay causing operation of the respective switch and energization of only that signal in the receiving station corresponding with the foregoing group, and other switches associated with and individually operable by the main relays to close an independent but common current return path from all of the signals in the selected group.

8. A telegraph comprising a plurality of transmitting stations each having a "standby" order signal, a circuit containing said signals and including a bus serving as a common feeder for all of said signals, positive current conductor means contactible with said bus, an order signal current return conductor, a common current return conductor, a main relay the winding of which is connected with said positive and common current return conductors, an auxiliary relay situated between said bus and positive conductor means, a plurality of switches in said positive conductor, means any one of which is operable to close part of said circuit thereby actuating said main and auxiliary relays thus energizing said bus and the signals fed therefrom, and switch means in said order signal current return conductor operable by the main relay to complete the signal circuit.

9. A telegraph comprising a plurality of transmitting stations having a plurality of various signals, a receiving station having a plurality of similar signals, a circuit containing said signals and including a bus serving as an independent but common feeder to prearrange the signals of one kind in the transmitting stations, positive current conductor means connectible with said bus, a current return conductor to which all of said prearranged signals are connected, a common current return conductor, a main relay which is connected with said positive and common current return conductors, an auxiliary relay having a winding connected between said bus and positive current conductor means, a plurality of switches in said positive current conductor means any one of which is manually operable to close part of said circuit, thereby actuating said main and auxiliary relays thus energizing said bus and the prearranged transmitting station signals fed therefrom, switch means in said positive current conductor means operable by the main relay to close another part of said circuit to energize the corresponding receiving station, and switch means in said signal current return conductor simultaneously operable by the main relay to complete the circuit from all of the signals.

10. A telegraph comprising a plurality of transmitting stations, a "standby" order signal in each station, a common positive bus having individual connections with one side of each of said signals, an auxiliary relay controlling the passage of current through said bus and relay including a magnet winding, a movable contactor and a fixed contact forming a connection with said bus; positive current conductor means connected in common with the contactor and one end of the winding, a current return conductor connected with the other end of the winding, a switch in said positive conductor, means for closing a circuit through said winding to said return conductor to attract the contactor into engagement with the contact thereby energize the bus and "standby" order signals, and means including a main relay controlling the passage of current from said signals comprising a movable contactor connected with said return conductor, a fixed contact in common electrical connection with the other side of each of said signals, a main relay winding connected respectively with said return conductor and said positive current conductor means for energization upon closure of said switch, and a member operable by said energization to move said contactor into engagement with said contact.

11. A telegraph including a plurality of transmitting stations each having a plurality of order signals, a receiving station having corresponding signals, said signals being subject to sympathetic operation upon operation of selected signals; means to confine operation to such selected signals comprising a bank of main relays each co-related to a group of similar order signals, a series of main busses of which each is in common connection with corresponding main relays and groups of similar order signals, and an auxiliary relay interposed in each connection between a bus and its companion group of order signals insuring the energization of but one group of order signals when its corresponding main relay is actuated.

12. A telegraph comprising conductor means, a plurality of transmitting stations and a receiving station to which said conductor is common, each station having groups of signals including an admonitory signal; means to confine signal-operation to the admonitory signals comprising an auxiliary relay for each group of signals actuated by current from said conductor, the relay of the admonitory signal group having associated means for conducting said current through the admonitory signal group of the transmitting stations only; a main relay actuated by current from said conductor, and having means for conducting said current through said admonitory signal of the receiving station only, and a manual switch which is closed to energize the conductor and thereby actuate the particular relays and render all admonitory signals active.

13. Means to insure operation of a selected signal group comprising a plurality of transmitting stations and a receiving station, a source of current, a positive wire and a group of busses, a group of signals in each station, a group of main relays each in connection with a particular bus, a switch in said positive wire furnishing current from said source for the energization of the wire, a selected bus and one of the main relays upon closure of said switch; means embodied in said energized relay for then closing a current path from the energized bus to a selected signal of the receiving station, means causing operation of corresponding signals only in the transmitting stations comprising a group of auxiliary relays respectively connected with the group of busses, one being actuated by the energized bus to complete a current path from said bus to the corresponding selected signals of the transmitting stations, and means in the energized main relay operated upon actuation of said main relay to produce a common return current path closure for the entire selected signal group.

14. A telegraph comprising a plurality of transmitting stations each having a plurality of companion pairs of order and reply signals, a plurality of busses connecting simi lar signals of all of the stations in groups, a plurality of relays individually corresponding to said pairs of signals each relay including a contactor movable against a pair of front points which have individual connections to the order and reply signal busses of the respective groups and providing positive current conductors for each, and means for selectively energizing any one order or reply signal group and confining the operation to such selected group, the then energized relay maintaining energization of the selected bus through one or the other individual connection.

WILLIAM REED HORNBERGER.